(12) United States Patent
Hernandez

(10) Patent No.: US 6,471,020 B1
(45) Date of Patent: Oct. 29, 2002

(54) ELECTRICAL CURRENT GENERATING/ DISTRIBUTION SYSTEM FOR ELECTRIC VEHICLES

(75) Inventor: Jose A. Hernandez, Acton, CA (US)

(73) Assignee: Jose A. L. Hernandez, Acton, CA (US)

( * ) Notice: Subject to any disclaimer, the term of this patent is extended or adjusted under 35 U.S.C. 154(b) by 0 days.

(21) Appl. No.: 09/541,273

(22) Filed: Apr. 1, 2000

(51) Int. Cl.[7] .................................................. B60L 1/00
(52) U.S. Cl. .......................................... 191/2; 307/10.1
(58) Field of Search ................................. 307/9.1, 10.1, 307/10.7; 191/2–8, 10, 22 R, 29 DM, 33 PM

(56) References Cited

U.S. PATENT DOCUMENTS

| | | | | |
|---|---|---|---|---|
| 4,014,418 A | * | 3/1977 | Ikeda et al. | 191/45 R |
| 4,139,071 A | * | 2/1979 | Tackett | 180/2 R |
| 5,455,500 A | * | 10/1995 | Shichijyo et al. | 322/90 |
| 5,608,271 A | * | 3/1997 | Saka et al. | 307/10.1 |
| 5,856,711 A | * | 1/1999 | Kato et al. | 307/10.6 |
| 6,137,247 A | * | 10/2000 | Maehara et al. | 318/140 |
| 6,376,928 B1 | * | 4/2002 | Saka et al. | 307/10.1 |

* cited by examiner

Primary Examiner—Matthew Nguyen

(57) ABSTRACT

ELECTRICAL CURRENT GENERATING/ DISTRIBUTION SYSTEM FOR ELECTRIC VEHICLES: Would incorporate a roadway transfer system which would work in conjunction with any electrical vehicle that can be provided by any automobile company, and equipped with the components /capability of acquiring power from the roadway system. The roadway power transfer system would be supplied with electrical power from any power provider/ power companies. Buy using power transformers to drop voltage to a workable AC or DC range/voltage, 2 strips would be used, with a negative potential being applied to one, and the positive potential being applied to the second strip. To utilize the power made available by the strips the system would incorporate the power made available by material embedded in the tire system, establishing electrical contact to enable the transfer of power from the roadway to the internally connected components to charge the battery pack, and run any AC or DC motor.

8 Claims, 12 Drawing Sheets

ELECTRICAL CURRENT GENERATING/ DISTRIBUTION SYSTEM FOR ELECTRIC VEHICLES

BACKGROUND OF THE INVENTION

In recent decades, energy shortages and the imposition of stricter environmental standards has created an increased awareness that a genuine need to find an alternative power source for motor vehicles exists. This view has been reinforced by the fact that more people are realizing that the supply of organic-based fuels is a finite quantity—it is currently predicted to be depleted by the middle of the 21st century. This realization has led to a number of alternative fuel sources being researched as a possible replacement for petroleum products to reduce the nations dependence on imported oil and to prepare for the time when this resource has been exhausted. These alternative fuel sources include gasohol, hydrogen, and electric power with several other possibilities being investigated. To date, each of these possibilities has not proven to be feasible as a direct replacement, major impediments were discovered during the research, development and early production stage. Gasohol, which is comprised of gasoline containing approximately 10% ethanol, looked promising, but the cost of gasohol is significantly higher than gasoline. Secondly, gasohol is frequently not available due to the high cost of transporting and storing it. Hydrogen has also been promoted as the fuel of the future—it is abundant, clean and cheap engines have been developed which use hydrogen as a fuel source, but the many problems of fuel supply and distribution must be resolved before hydrogen may be considered as a feasible product for mass energy requirements. Concerns about economics and safety also limit the wider use of hydrogen for decades. Although energy standards have created a clear market for alternative energy cars, manufacturers have to develop an affordable and practical vehicle. Although several automobile companies are testing electrical vehicles, none is considered a practical replacement for the internal combustion engine. Either the car must be recharged too often or they are too expensive. The primary difficulty with electric cars lies in inadequate battery power. Currently, these cars use lead-acid or nickel-cadmium batteries and have a range of 40 to 50 miles on a single charge. This range is reduced by factors such as cold temperatures, the use of air conditioning, vehicle load and steep terrain. Recharging the battery pack usually takes about eight hours. It is generally believed that a major breakthrough in battery technology is needed before an electric vehicle can be feasibly considered as a viable transportation option to the internal combustion engine. I have considered the limitations of electric cars currently available, as described, and have conceptually devised a system, which addresses these limitations. This system, designated as "DELTA CONVERTER TWO".

SUMMARY OF THE INVENTION

Would incorporate a roadway transfer system which would work in conjunction with an electrical vehicle propulsion system, provided by the automobile companies, equipped with the capability of acquiring power from the roadway system. The roadway power transfer system would be supplied with electrical power from power provided by: power companies, using a step-down transformer to drop the line voltage down from the kilovolt rang to a workable AC range. The output of the step-down transformer would be routed down the power system, through a conduit, and connected to a rectifier, recessed in the road surface. The rectifier would convert the AC voltage into DC voltage, with this DC voltage being applied to electrically conductive strips, installed in the road surface. Two strips would be used, with the negative potential being applied to one strip and the positive potential being applied to the second strip. The effective DC voltage potential to be made available would be 312 (+) DC volts. Power transfer strips would be installed on both sides of the roadway to make this power available for vehicles going in opposite directions. To utilize the power made available by the strips, the vehicle propulsion system would incorporate conductive material embedded into the tires of the vehicle, to establish electrical contact to enable the transfer of power from the roadway system to the vehicle. The brushes would be electrically connected to the tires, which in turns, are fastened to the suspension system. The DC voltage would then be applied, in parallel, to the internally connected voltage regulator, to the internally contained inverter (converts DC to AC voltage) and also used the DC voltage as a charging source for the internally contained battery pack. Note: The output of the inverter would then be applied to a three phase electrical AC motor, that the automobile companies are using at this time, which is the prime driver providing the vehicle driving torque. The inverter employed would use insulated, gated, bipolar transistors to accomplish the voltage conversion. The battery pack would also be valve regulated; charging current would be applied to the battery pack as required.

BY WAY OF EXAMPLE, U.S. Pat. No. 4,139,071 Tackett, while these device fulfill the respective, particular objective and requirements, the patent, can not provide AC or DC current to any electric vehicles motor, the constructions would not work.

BY WAY OF EXAMPLE, U.S. Pat. No. 4,014,418 Ikeda, while these device fulfill the respective, particular objective and requirements, the patent, can not provide AC or DC current to any electric vehicles motor, the construction would not work.

BY WAY OF EXAMPLE, U.S. Pat. No. 3,016,024 Silver, while these device fulfill the respective, particular objective and requirements, the patent, can not provide AC or DC current to any electric vehicles motor, the construction would not work.

Note: While these devices fulfill their respective, particular objectives and requirements, the patents can not and do not describe an electrical current generating/distribution system for electric vehicles or any automobiles of present or future.

In this respect, the electrical current generating/ distribution system for electric vehicles according to the present invention substantially departs from the conventional concepts and designs of the prior art, and in doing so provides an apparatus primarily developed for the purpose of supplying electrical current to electrically operated vehicles present and future cars. Therefore, it can be appreciated that there exists a continuing need for a new and improved electrical current generating/distribution system for electric vehicles to provide transportation for all.

There has been outlined, rather broadly, the more important features of the invention in order that the detailed description that follows may be better understood, and in order that the present contribution to the art may be better appreciated. There are, additional features of the invention that will be described, and which will form the subject matter of the claims appended here to. In this respect, before explaining at least one embodiment of the invention in detail, it is to be understood that the invention is not limited in its application to the details of construction and to the arrangement of the components set forth in the following description or illustrated in the drawings. The phraseology and terminology employed herein are for the purpose of description and should not be regarded as limiting. As such, those skilled in the art will appreciate that the conception, upon which this disclosure is based, may readily be utilized as a basis for the designing of other structures. Note: only this system will carry out the purpose for the electric vehicles of the future.

BRIEF DESCRIPTION OF THE DRAWINGS

The invention will be better understood and objects other than those set forth above will become apparent when consideration is given to the following detailed description thereof. Such description refers to the annexed drawings wherein.

Note, the same reference numerals will refer to the same parts through the various figures.

DESCRIPTION OF THE PREFERRED EMBODIMENT

Figure 1:
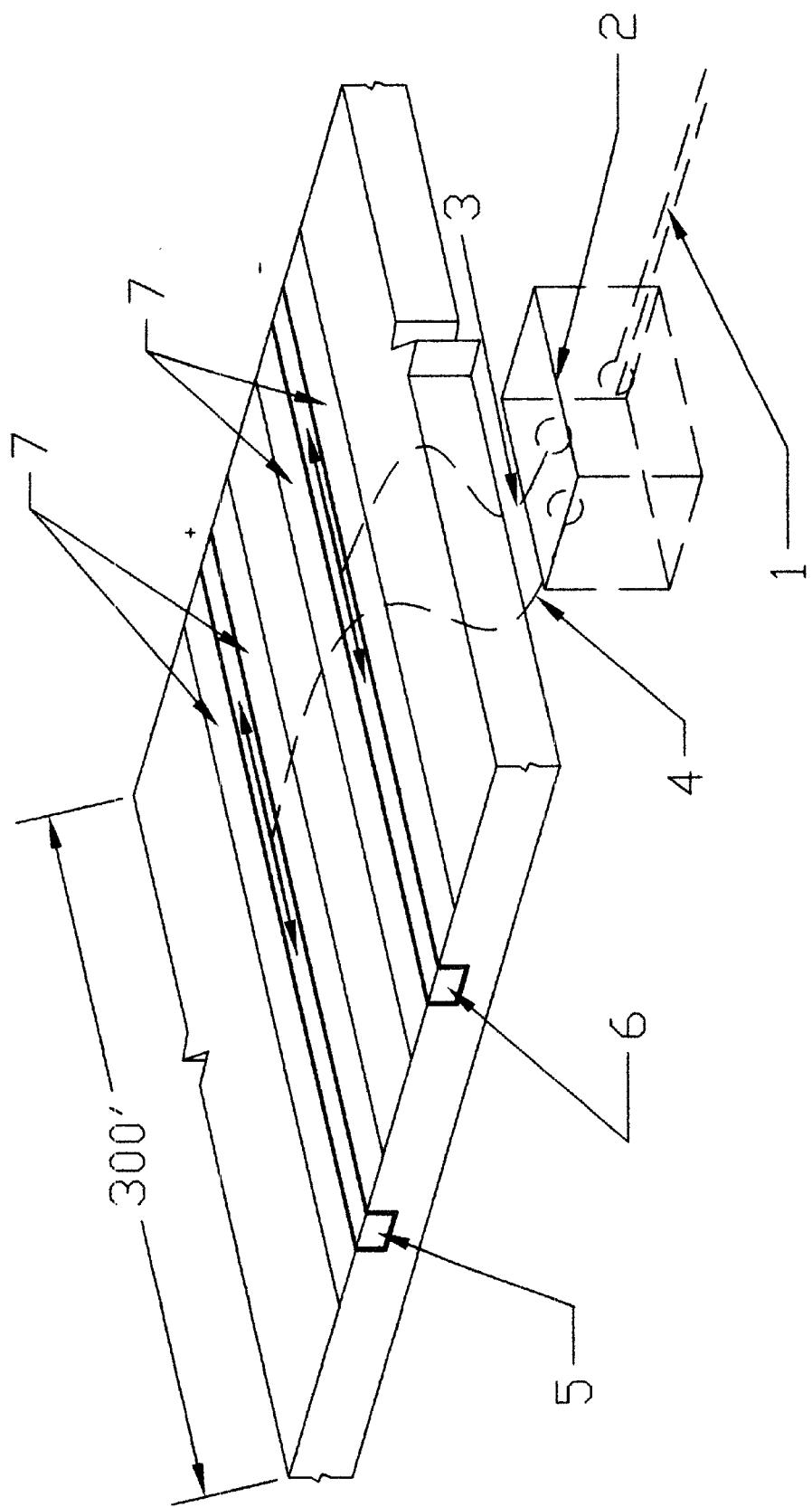
FIG. 1 is a perspective view of the preferred embodiment of the roadway/highway/freeway electrical transfer system in a current DC generating system for electric vehicles.

With reference now to the drawings, and in particular, to FIGS. 1 through 12 thereof. The preferred embodiment of the new, and improved electrical current distribution system for all electric vehicles that would embody the principles and the concepts of the present invention, and generally designated number 34 will be described: Note: Specifically the example of any practical electrical vehicle of all the automobile companies that are manufacturing electric cars, and having an AC motor.

With the addition of the companies of the various Figures, the device relates to an electrical distribution system for electric vehicles for supplying electrical current to run the AC motors of any electric vehicle, and supply all the power that it will ever need, in its broadest context, the device consist of, conductive strips distributing DC current, the tire system would distribute the DC current to the brush system, to the cables, to the voltage regulator. Note: such components are individually configured and correlated with respect to each other so as to attain the desired objective; Cable 1 shows the power distribution of AC current. Note: would be the current that the local power company could and will provide (34.5 kv., 4.8 kv., 240 v. 120 v. is AC current), cable 1 will be connected to the rectifier 2 which would convert the AC to DC current, the DC current would exit the rectifier 2, by two cables 3,4. Cable 4 would provide the positive DC potential to 5 and cable 3 would provide the negative DC potential to 6. Providing DC current to any electrical operated vehicle with the corresponding electrical pickup system, and components that are being described. Tire 8 and the components 9 would pick up the DC current provided by 5,6 and 9 will distribute the current to component 10, 13, the current would be picked up by 19,20, and the DC current would be distributed by cable 21,22. Cable 21,22 would make the connection to components 25, note: 21 would provide the positive DC potential to 25, and 22 would provide the negative DC potential to 25. Note: 25 is the voltage regulator. Cable 28,29 DC current that would exit the regulator, would be in communication with the inverter 32 that would convert the DC to AC to make the connection, to the AC motor 33 to run the vehicle and all the car internal components.

Figure 3:
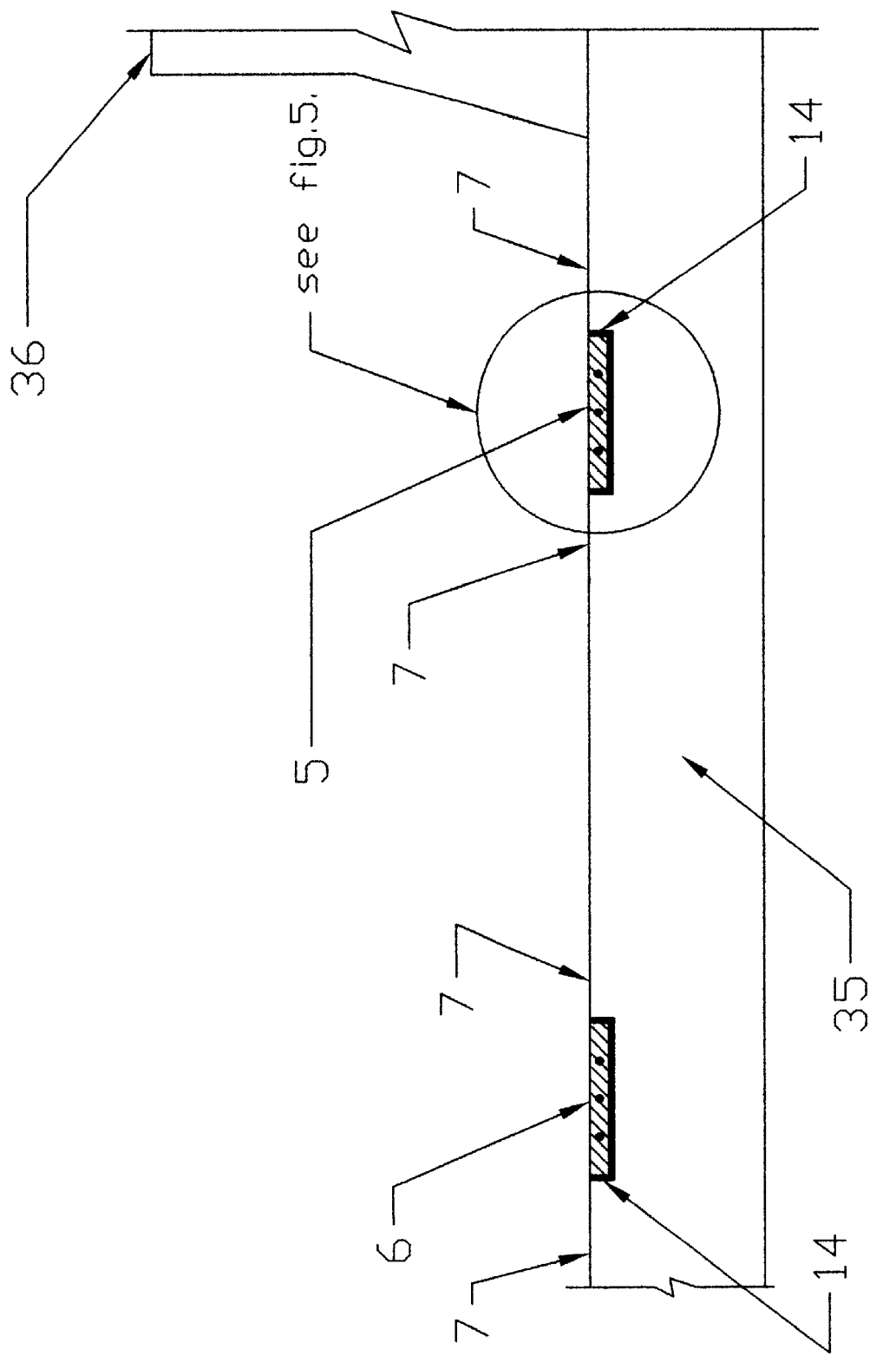
FIG. 3 is a cross section view of the preferred embodiment of the road/highway/freeway system. Note: optional means of construction of system.
Figure 4:
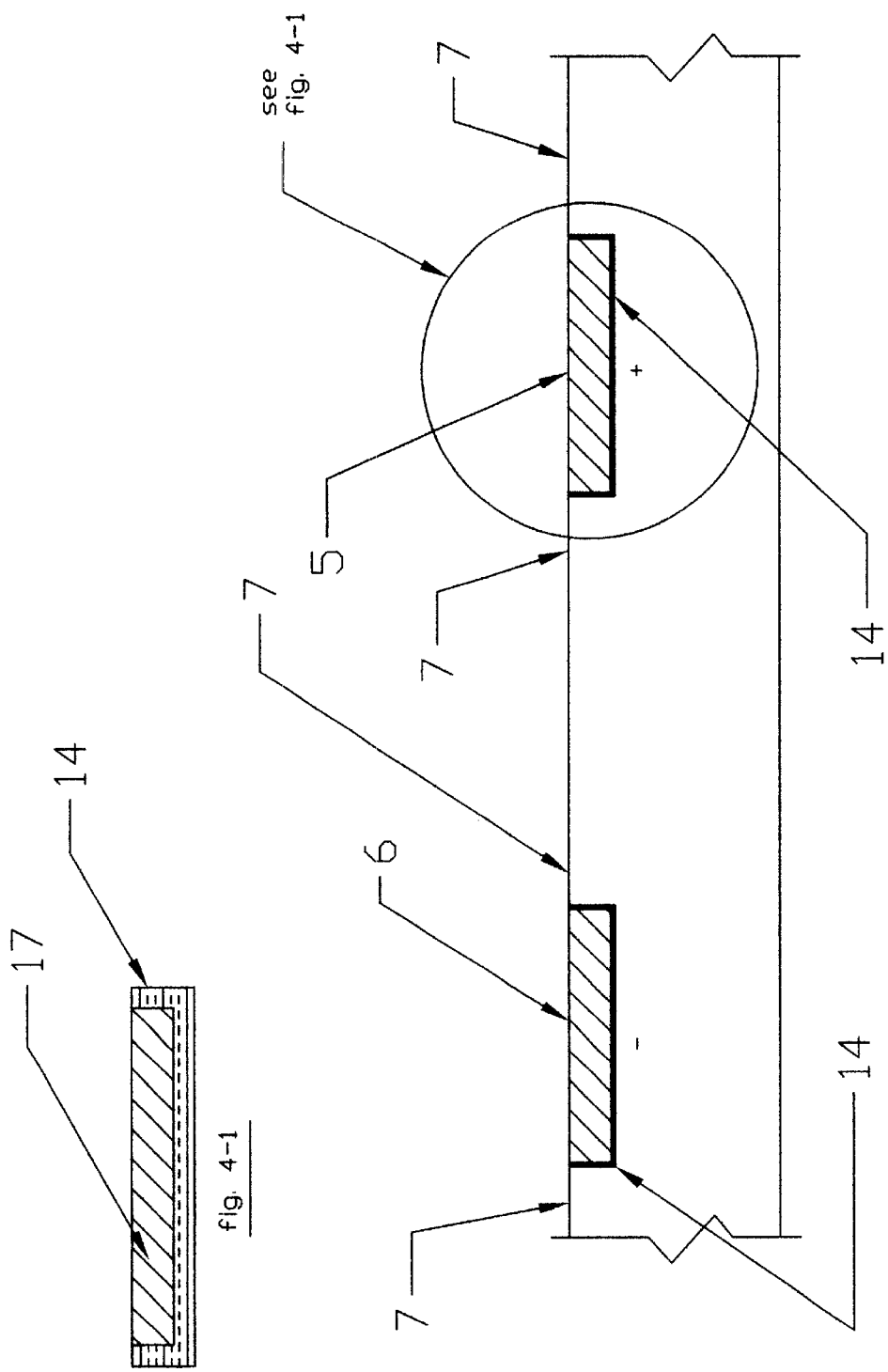
FIG. 4 is a cross, section view, of the preferred embodiment of the road/highway/freeway electrical transfer system. Note: optional means of construction.

Note: a second embodiment to the present invention is shown in FIGS. 3 and 4 it would include substantially all of the components of the present invention except for the inverter the system could run a DC motor. Note: only an example at this times in history a DC motor for electrical vehicle is not in production at this time. Note: As to the manner of usage and operation of the present invention, the same should be apparent from the above descriptions. Accordingly, no further discussion relating to the manner of usage and operation will be provided. With respect to the above descriptions then, it is to be realized that the optimum dimensional relationships for the parts of the invention, to include variations in size, materials, shapes, forms, function, and the manner of operation, assembly, and use, are deemed readily apparent, and obvious to one skilled in the art, and all equivalent relationships to those illustrated in the drawings and described in the specification are intended to be encompassed by the present invention. Therefor, the foregoing is considered as illustrative only of the principles of the invention, further, since numerous modification and changes will readily occur to those skilled in the art, it is not desired to limit the invention to the exact construction and operation shows and described, and accordingly, all suitable modification, and equivalents may be to, falling within the scope of the invention.

Nomenclature of Drawings

Note: this section is for the explanation of drawings and potential working components that must be utilized for the Design and Implementation of this system called the Electrical current Generating/Distribution System for Electric Vehicles. A number identifies each component in the Figures and Drawings; you can see the function and (formation of possible combination) the components for the distribution of current (AC or DC), to any electric (with an AC or DC motor) vehicle incorporated with the flowing components.

Figure 2:
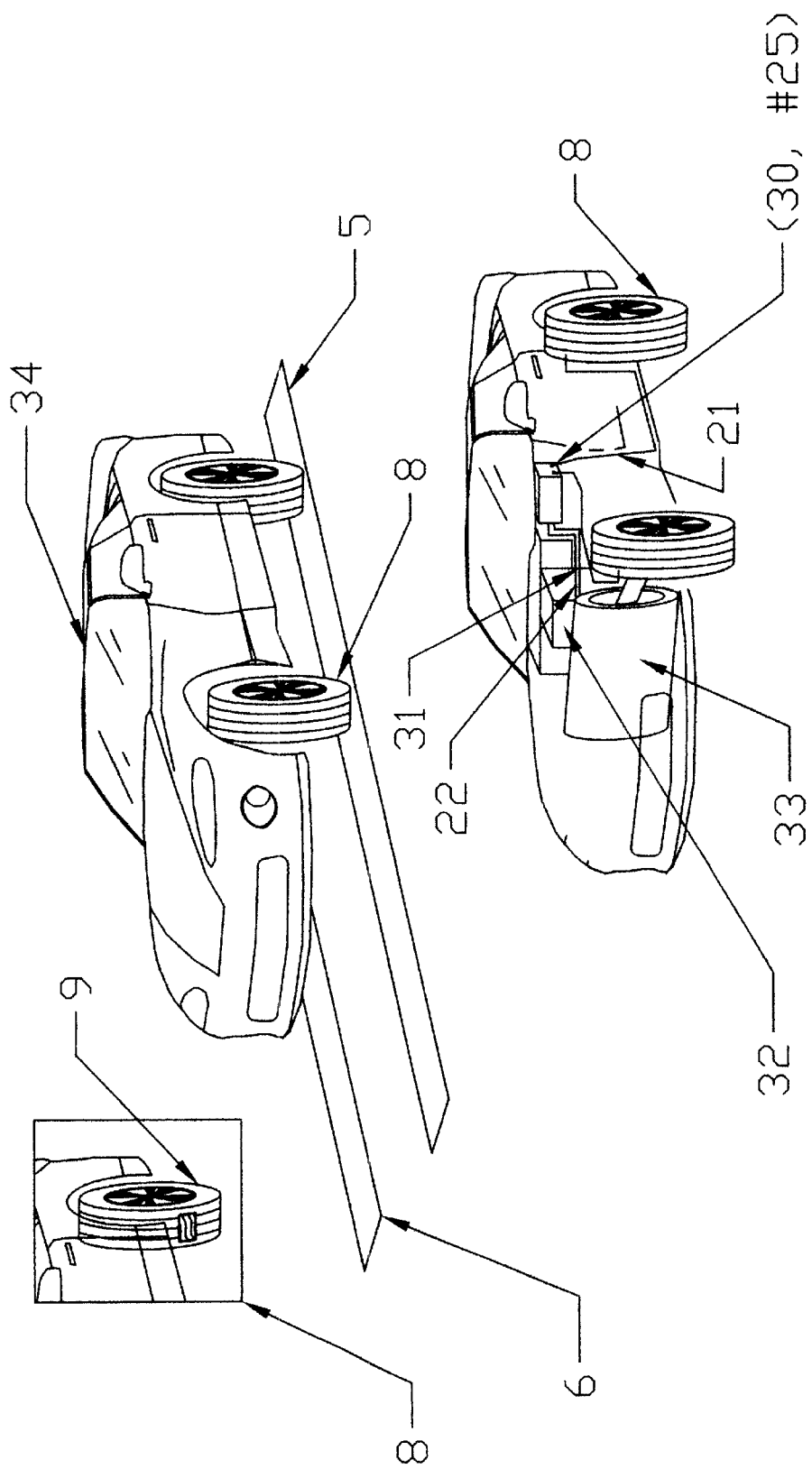
FIG. 2 is a perspective view of the electrical transfer system which would be comprised of a road/highway electrical transfer system. Note: which would supply power (DC) to the corresponding electrical cars of the future equipped with the electrical pickup system to run the AC motors.
Figure 5:
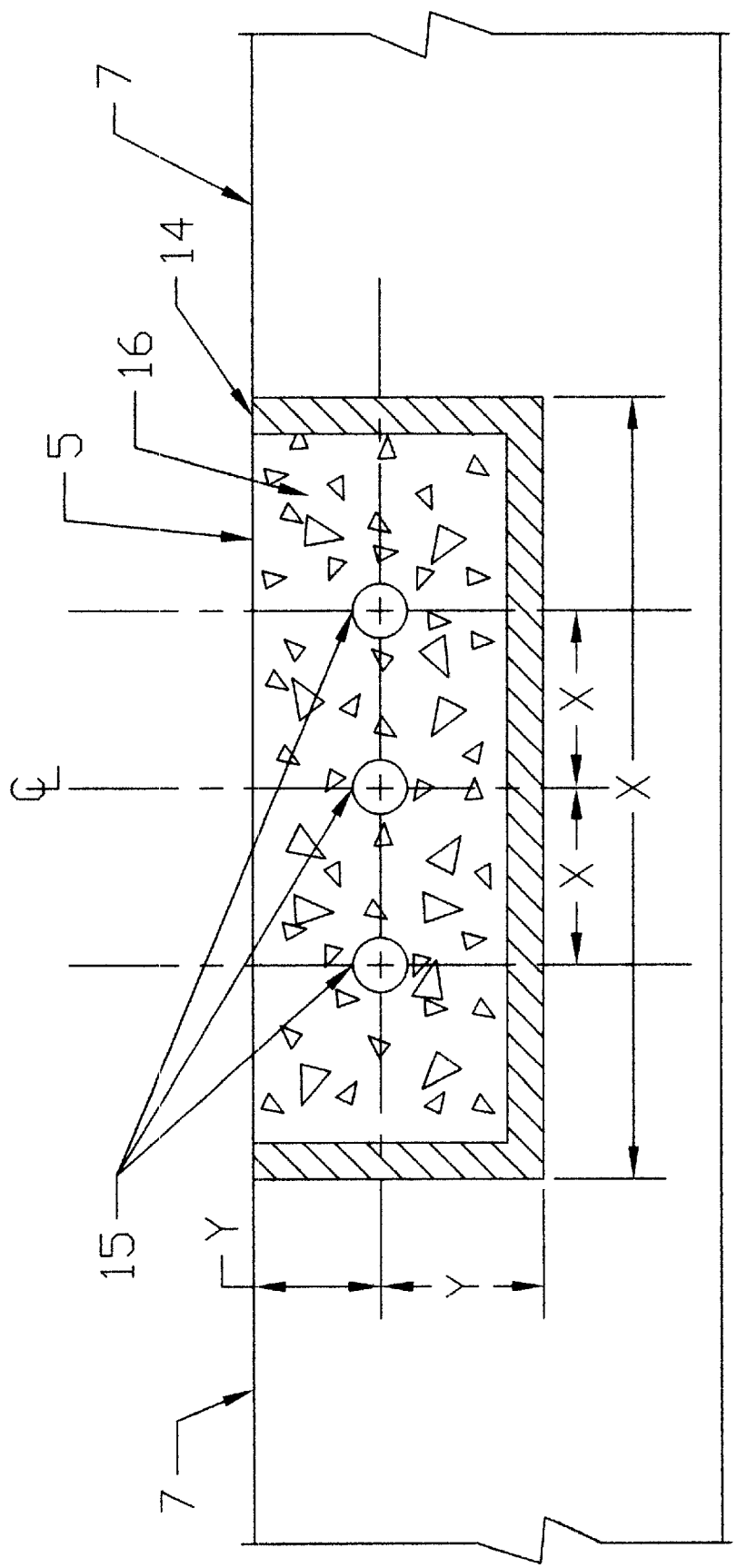
FIG. 5 is a view of the section from FIG. 3. Note: is a cross section sufficient to establish the positions, and general out line of the components.
Figure 6:
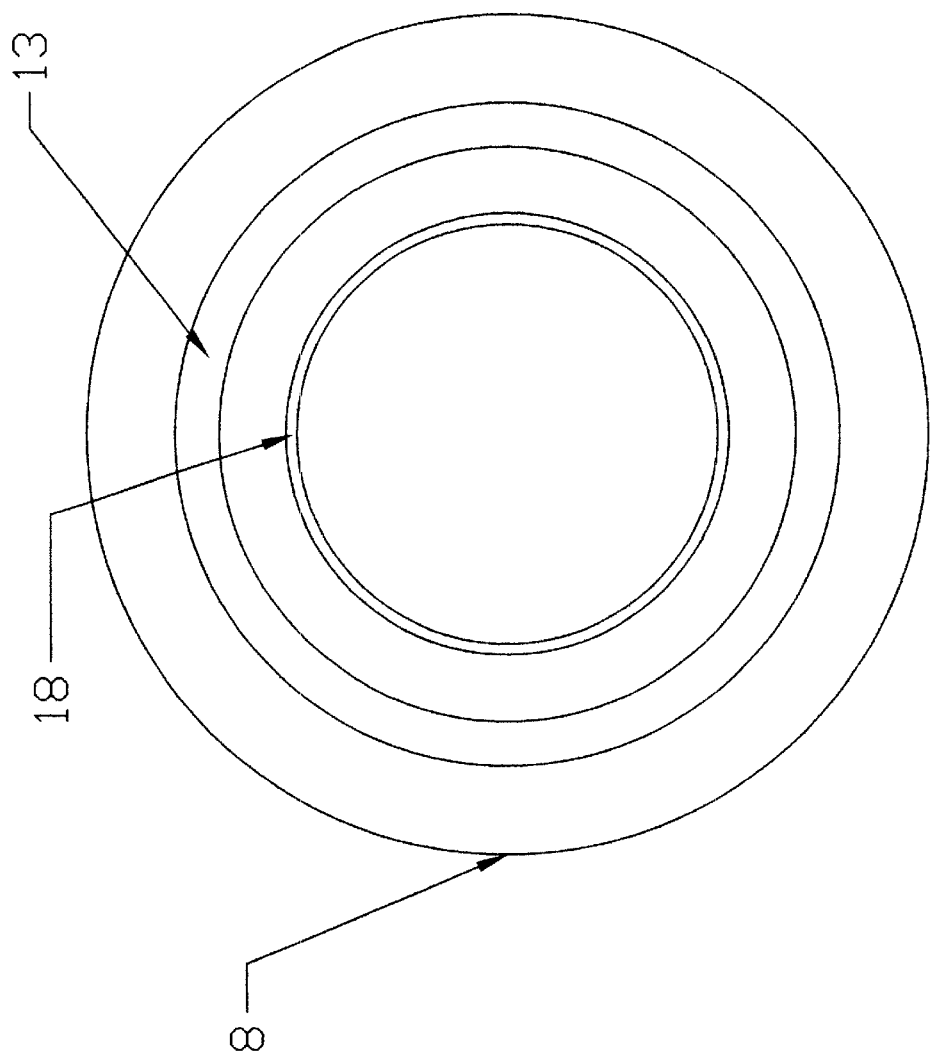
FIG. 6 is a side view of the tire system of the present invention.
Figure 7:
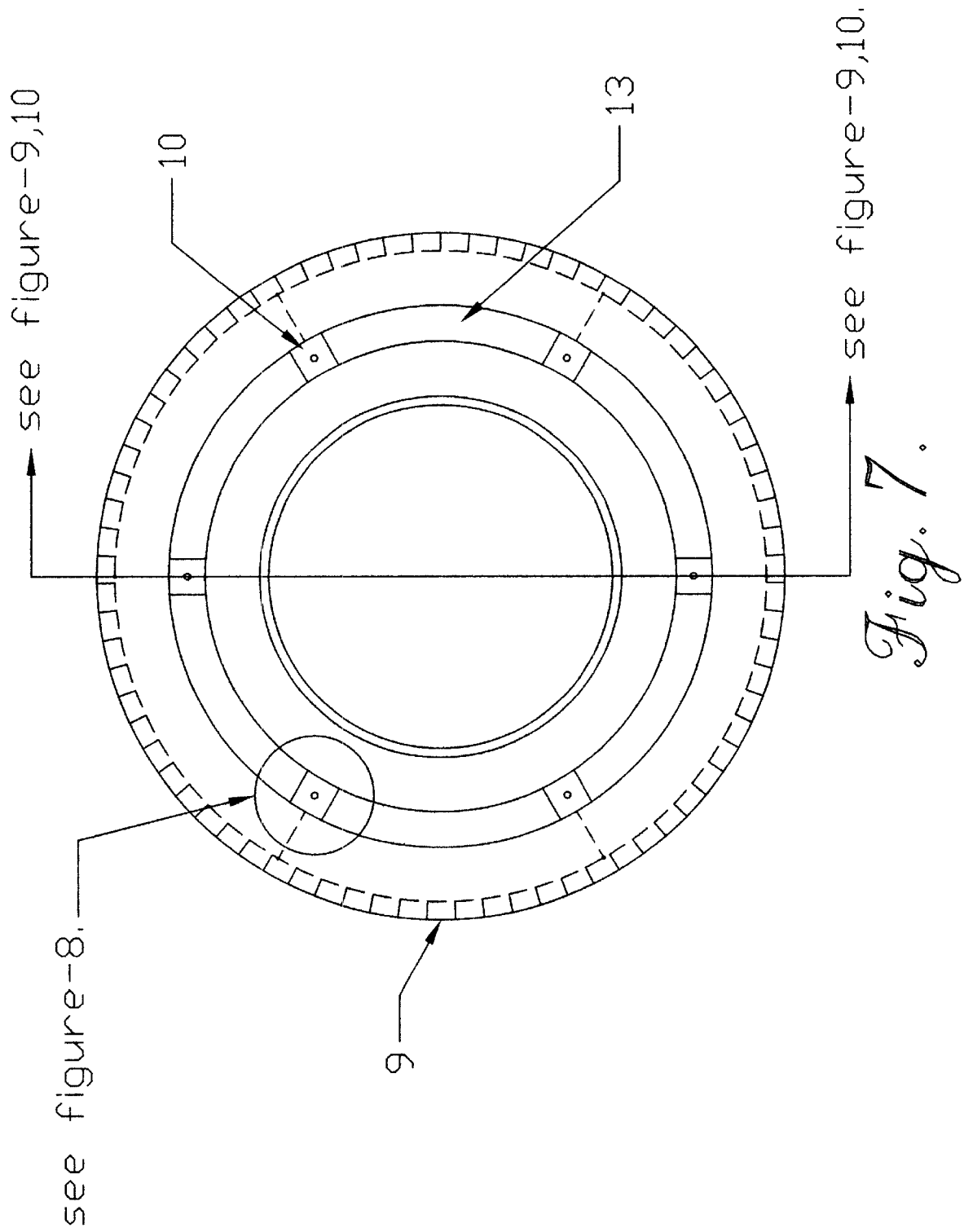
FIG. 7 is a cross section of the tire system, and shows conductive material embedded into the tire of the present invention.
Figure 8:
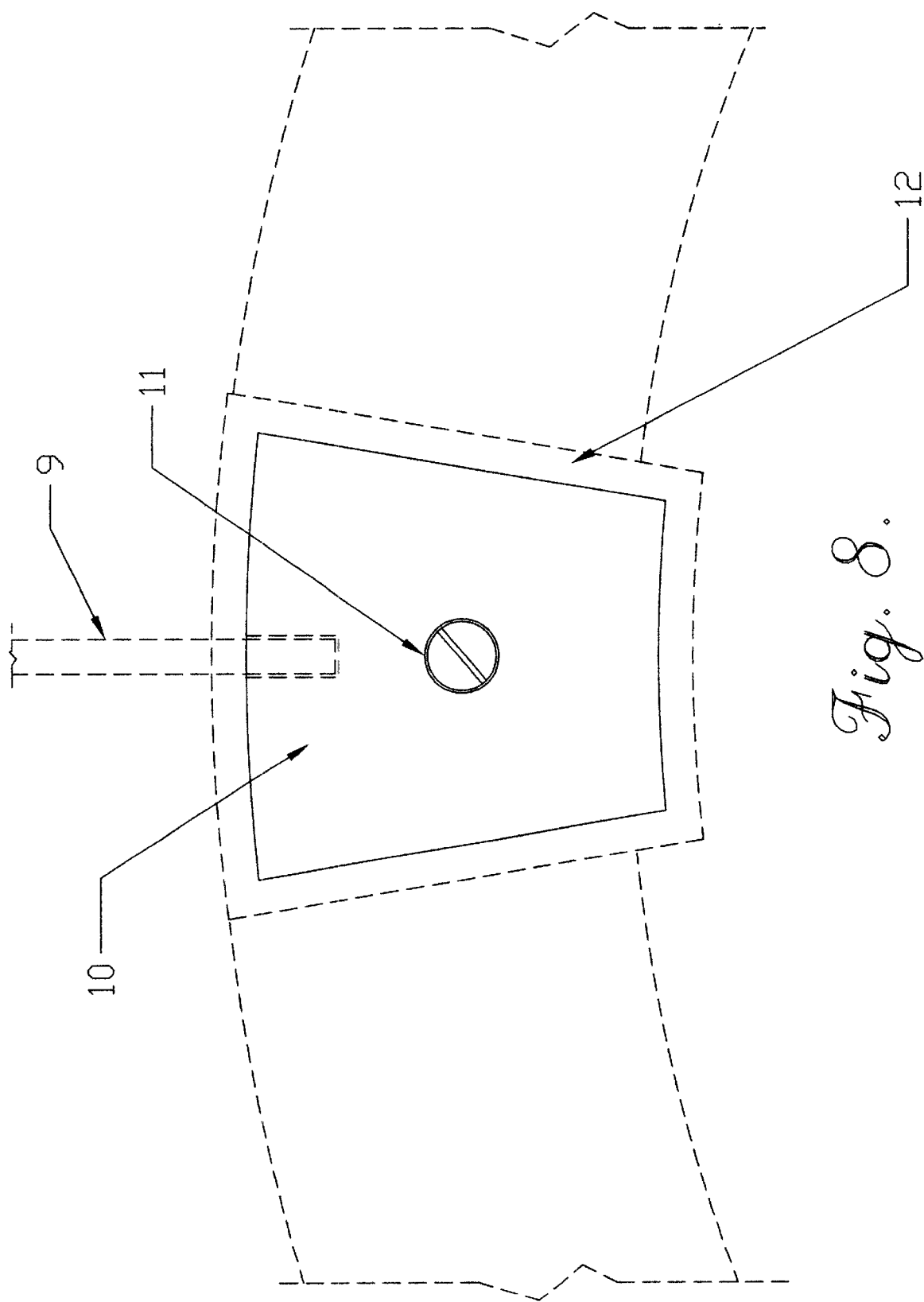
FIG. 8 is a view of the construction, material, and the components of the tire system.
Figure 9:
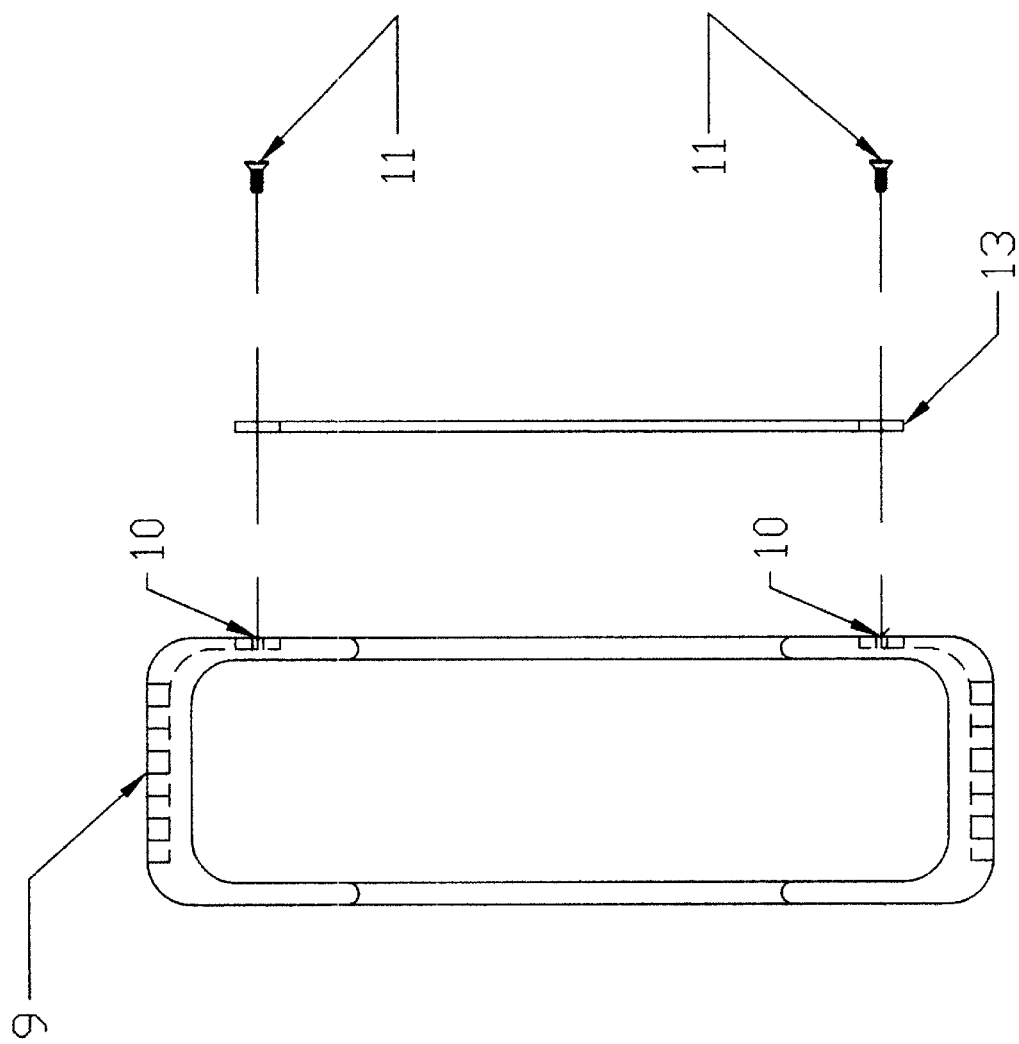
FIG. 9 is a cross section view, exploded diametric of the tire system, Note: shows the construction of components and assembly.
Figure 10:
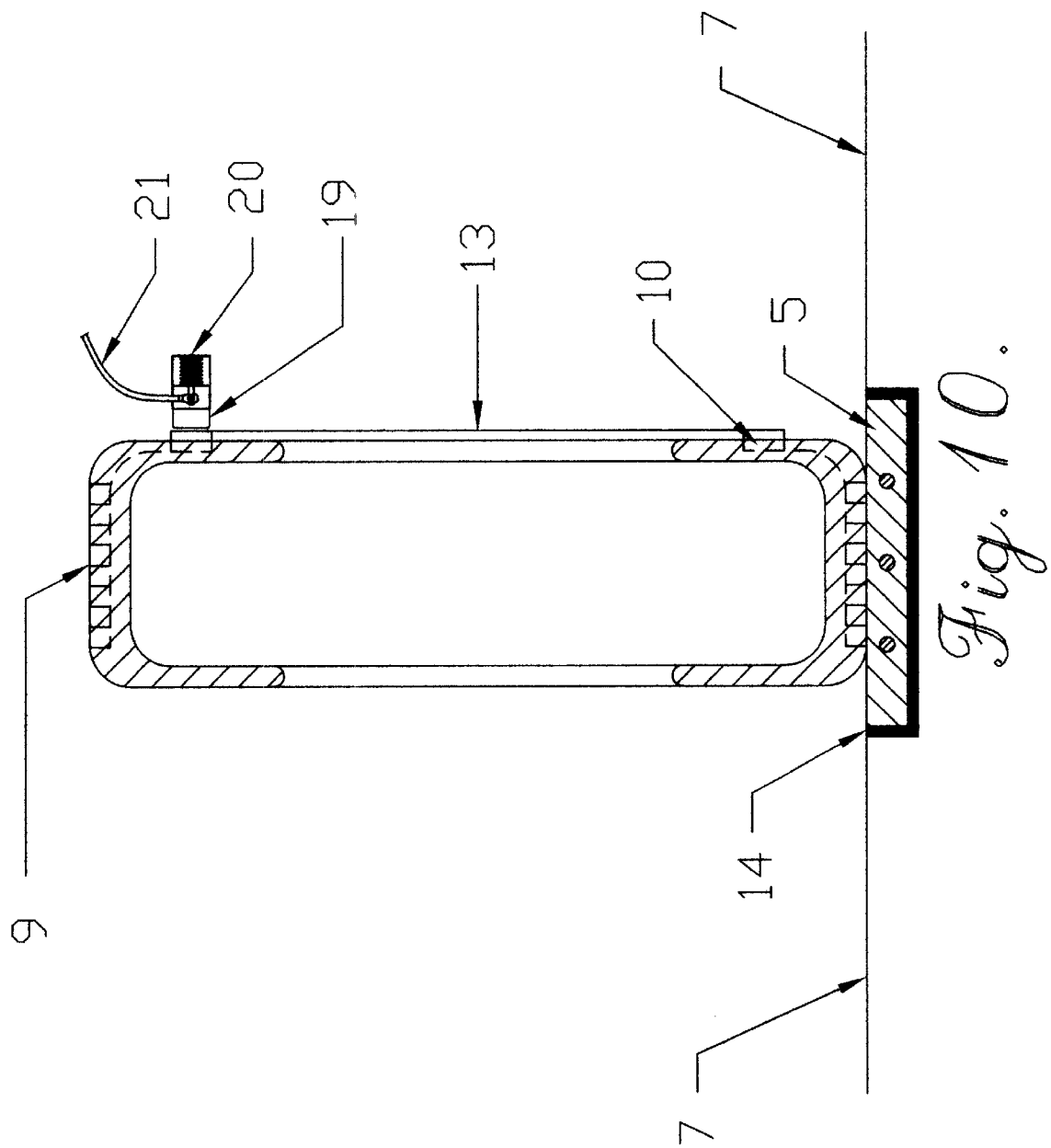
FIG. 10 is a cross section, perspective view that shows all components in the assembly to provide the current (DC) to the corresponding voltage regulator.
Figure 11:
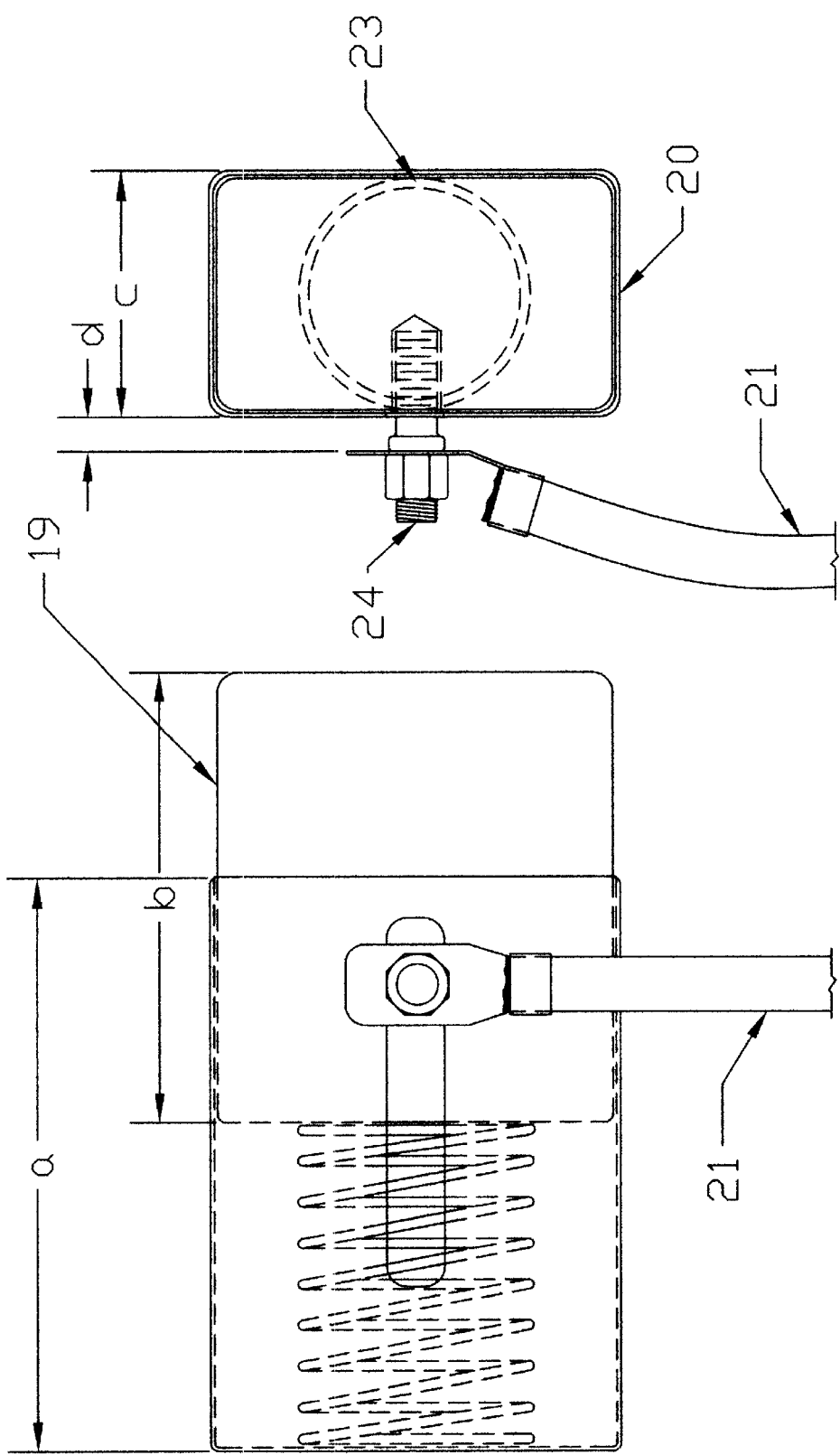
FIG. 11 is a front, side view of the brush system, and the working components, and the connections of the cables.
Figure 12:
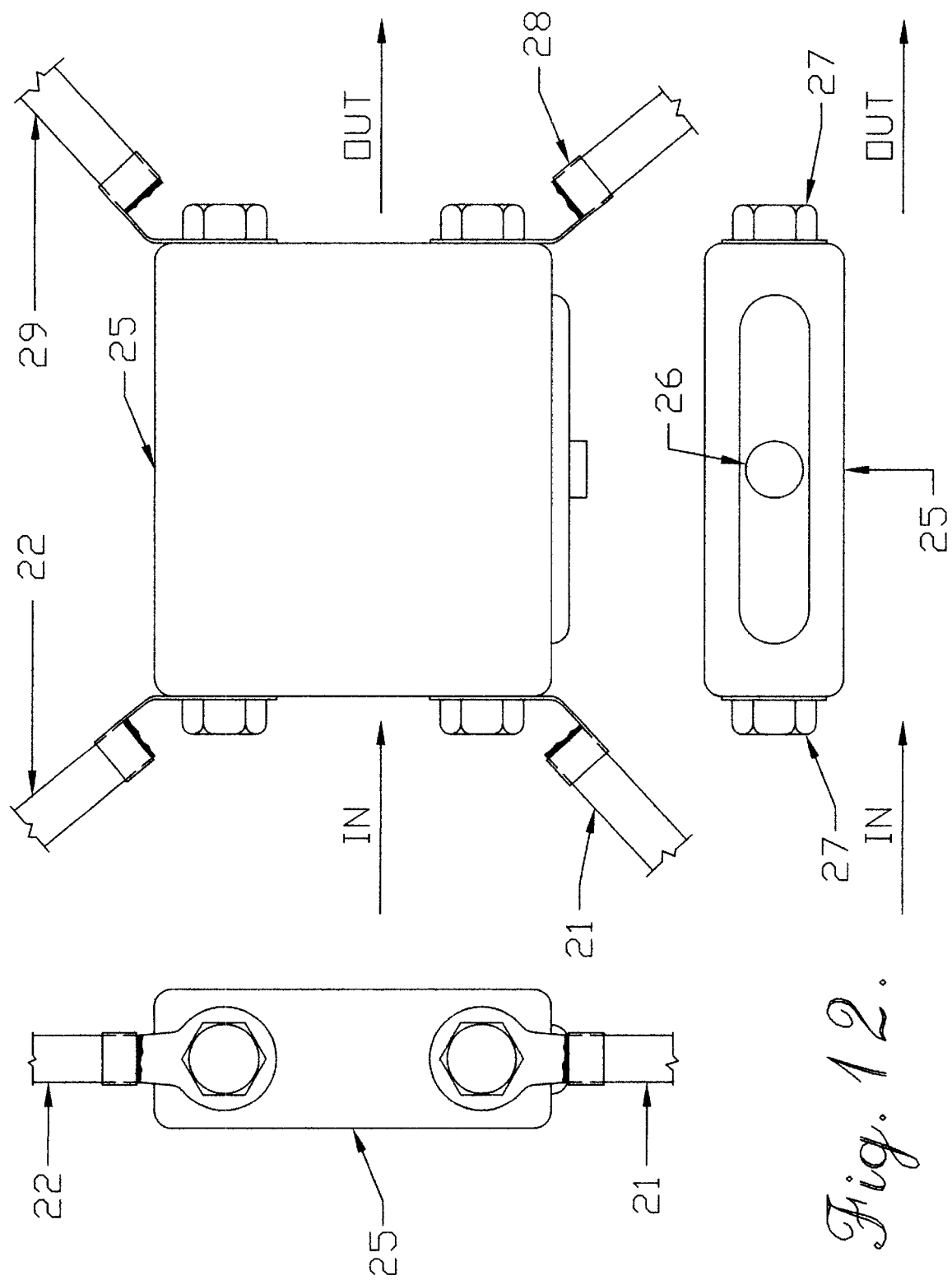
FIG. 12 is a front side and top view of the voltage regulator, and cable assembly that would provide DC current to any electric vehicle.

1. In FIG. 1 is the conductor and connection of electrical current, by using a conductor to provide power to the system, which can be provided by any utility company (AC current, "Y" or DELTA power system).
2. In FIG. 1 is typical utility vault/manhole is a housing for any power transformers that will be used and power converters/rectifiers for the conversion (AC or DC) frequency to a workable level.
3. In FIG. 1 is a conductor that will distribute a potential/ frequency to the strips in the road providing (AC or DC) current.
4. In FIG. 1 is a conductor that will distribute a potential/ frequency to the strips in the road providing (AC or DC) current.
5. In FIG. 1 is the illustration of the potential strip that will provide current to the pickup sensors in the tire system providing (AC or DC) frequency.
6. In FIG. 1 is the illustration, and view of one strip that will distribute the current to the pickup sensors, in the tire system providing distribution of (AC or DC) power or frequency to the components.
7. In FIG. 1 is a non-conductive paint in the color of the road surface this will help provide additional protection from ground during vehicle rolling on to and exiting system and rainfall.
8. In FIG. 2, FIG. 6, FIG. 7, and FIG. 8 is the position of the conductive material imbedded in the inner wall of the tire system for the distribution of current provided by the strips to the following components, is the formation, and construction of a distribution harness or webbing, and conductive plat is a component of the construction of the tier system.
9. In FIG. 2, FIG. 7, FIG. 8, FIG. 9, FIG. 10, is the current path of the highway to the supporting components and system for the distribution of power/frequency to all components in this design, for example; copper or equal conducive material, can be used for the construction of the tire system/components.
10. In FIG. 8, and FIG. 9, is a section of the tire components, this part would be in the construction of the tire system in combination with other parts secured by fasteners that will be used, would secure the mechanical components provided a path, that will transfer the current to the rest of the components of the tire system.
11. In FIG. 8, and FIG. 9, is the location of a fastener that can be used or welded in the same location, is the position would hold the conductive strip in the inner wall forming a free flow of current to the working components of the tire system.
12. In FIG. 8, is the example of a combination of components embedded in the tire and conductive strip together and forming a path for the distribution of current in the tire system.
13. In FIG. 6, FIG. 7, and FIG. 10, is a conductive plate ore ring consisting of any metallic conductive material or copper material forming the distribution of current from the tire system to the brush/magnetic system.
14. In FIG. 5 and FIG. 10, is insulated material for all the strip options for the protection form ground.
15. In FIG. 5, and FIG. 10, is the location of conductors that would complet the construction of the cement formula for the distribution of current (AC or DC); note cable must be exposed with no insulation to distribute the current to the cement formula
16. In FIG. 5, is an electric current generating/distribution system for all electric vehicles for supplying electrical current to the AC or DC motor in electrically operated cars: wherein the conduction of the strip system are made up by formula, 3 parts rock (0.5" or 1" rock)+2 parts sand+2.5 parts cement; addition is 3 parts (conductive material the size 0.5" or 1")+2 parts (conductive material, the size of sand)+1 part (metallic or conductive material, the size of dust or powder)+additional (2.5 parts cement)+6 gallons of water, pour into insulated material and around non insulated cables; the conductive system further including conductive strips made of solid conductive metal.
17. In FIG. 4 see (FIG. 4-1) is optional conductive strip of any solid metallic surrounded on three sides by insulation for protection from ground.
18. In FIG. 6 is an optional conduction location on the wheel but the construction would be too costly.
19. In FIG. 10, and FIG. 11, is the example of the brush/ magnetic system for the distribution of current to the working components that fallow.
20. In FIG. 10, and FIG. 11, is a housing of the brush/ magnetic components for pick up and distribution of current (AC or DC).
21. In FIG. 10 and FIG. 12, is a cable for the connection of components for example the rectifier and the battery units and brush system for the distribution of current (positive) or in any combination of (AC or DC).
22. In FIG. 10, and FIG. 12, is a cable for the connection of components for example the rectifier and the battery units and brush system for the distribution of current (negative) or in any combination of (AC or DC).
23. In FIG. 11, is a spring loaded brush/magnetic system and housing components for the construction of system in keeping working component in there proper location, for the distribution of current, (AC or DC).
24. In FIG. 12, are the identification and the description of fasteners that would make the required connection with all the working coponents of the brush/magnetic system
25. In FIG. 12, is the identification and description of the voltage regulator for the electric current and distribute to the components on the vehicles, which will run on any optional frequency and distribute the workable current to the battery unit and the electric motor of the vehicle.
26. In FIG. 12, is a potential location for a circuit barker, and is for the protection of the electrical component of the vehicle from any power surge.
27. In FIG. 12, location of the fasteners for the working components of the system for the distribution of current or (AC or DC).
28. In FIG. 12, is the location of the conductor that can distribute (AC or DC) frequency.
29. In FIG. 12, is the location of the conductor that can distribute (AC or DC) frequency.
30. In FIG. 2, is the location of the voltage regulator Regulating the voltage/current made available, and distribution to battery unit, and motor of vehicle.
31. In FIG. 2, is the location of the cable/conductor distributing the required current to the working components.
32. In FIG. 2, This number will show the location of the power inverter (AC to DC) or (DC to AC) depending on the combination of motor (AC or DC motor).
33. In FIG. 2, is the location of the (AC or DC) motor.
34. In FIG. 2, This number is al example of any electric automobile having an electric motor (AC or DC) that can be provided by an automobile company.

35. In FIG. 3, This number is an example of any freeway or roadway system that can be used for the implementation of this system.

36. In FIG. 3, This number is the example of any freeway divider.

What is claimed is:

1. An electrical current generating/distribution system for all electric vehicles for supplying electrical current to electrically operated vehicles comprising, in combination: an electric car having as AC or DC electric motor, the electric car having a storage battery unit, the storage battery unit having a voltage regulator coupled there with, the voltage regulator in communicating with the AC or DC electric motor for transferring electric energy to the storage battery unit, and to the electric AC or DC motor, the system in communication with, a conductive tire system, Road Conductive Strip/Formula system, rectifier system, and existing "Y" or "delta" power system the system forming a rotating magnetic field, in communication with conductors/cables extending to components; the tire system, brush system, being in communication with an inverter, conductive inner surface plate of the tire system; the brush system or magnetic system being secured to a brush housing system, all components being insulated and secured to a suspension system on the electric vehicles; the brush system being engaged with a gear member wherein the gear member will cause the brush system or magnetic system, to move to the inner conductive surface plate of the tire system to make contact; a conductive plate of the inner tire system, housing, and the brush system or magnetic system being in communication with the control mechanism; the voltage regulator, and circuit breakers disposed within the interior of the electric car system.

2. An electrical current generating/distribution system for all electric vehicles for supplying electrical current to the AC or DC motor of electrically operated cars according to claim 1, wherein the AC or DC power is produced by the use the rectifier system or a power transformer.

3. An electrical current generating/distribution system for all electric vehicles for supplying electrical current to the AC or DC motor in electrically operated cars according to claim 1, wherein the conduction and strip system are made up by formula, 3 parts rock (0.5" or 1" rock)+2 parts sand+2.5 parts cement; addition is 3 parts (conductive material the size 0.5" or 1")+2 parts (conductive materials the size of sand)+1 part (metallic or conductive material, the size of dust or powder)+additional (2.5 parts cement)+6 gallons of water, pour into insulated material; the conductive system further including conductive strips made of solid conductive metal.

4. An electrical current generating/distribution system for all electrical vehicles for supplying electrical current to the AC or DC motors of electrically operated car according to claim 3, wherein the insulated material is used for the purpose of insulating of conductive strips from ground.

5. An electrical current generating/distribution system for all electric vehicles for supplying electrical current to the AC or DC motors of electrically operated cars according to claim 1, wherein the conductive material of the tire system or magnetic system is a system for distribution of power to components in the car.

6. An electrical current generating/distribution system for all electrical vehicles for supplying electrically operated cars according to claim 1, wherein brush system including a brush component a brush unit, a spring, and brush housing.

7. An electrical current generating/distribution system for all electric vehicles for supplying electrical current to the AC or DC motors of electrically operated cars according to claim 1, wherein the voltage regulator is for regulating the frequency of AC or DC current, in communication with AC or DC circuit breaker in the protection of the system.

8. An electrical current generating/distribution system for all electrical vehicles for supplying electrical current to the AC, or DC motors of electrically operated cars according to claim 1, wherein the conductor/cable system is used for connecting all the components by fasteners for the distribution of power.

* * * * *